(12) United States Patent
Uchiba et al.

(10) Patent No.: US 10,676,134 B2
(45) Date of Patent: Jun. 9, 2020

(54) VEHICLE-BODY STRUCTURE

(71) Applicant: MAZDA MOTOR CORPORATION, Hiroshima (JP)

(72) Inventors: Yuuki Uchiba, Hiroshima (JP); Atsushi Kawamoto, Hiroshima (JP); Hiroto Kido, Aki-gun (JP); Yasushi Ishikawa, Hiroshima (JP); Daisuke Kanamaru, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/103,749

(22) Filed: Aug. 14, 2018

(65) Prior Publication Data

US 2019/0061824 A1    Feb. 28, 2019

(30) Foreign Application Priority Data

Aug. 23, 2017    (JP) .................. 2017-159888

(51) Int. Cl.
| | | |
|---|---|---|
| *B62D 21/15* | (2006.01) | |
| *B62D 25/02* | (2006.01) | |
| *B62D 25/04* | (2006.01) | |
| *B62D 25/14* | (2006.01) | |

(52) U.S. Cl.
CPC ......... *B62D 21/152* (2013.01); *B62D 25/025* (2013.01); *B62D 25/04* (2013.01); *B62D 25/145* (2013.01)

(58) Field of Classification Search
CPC .... B62D 21/152; B62D 25/145; B62D 25/04; B62D 25/025; B62D 25/08
USPC .................................................. 296/187.09
See application file for complete search history.

(56) References Cited

U.S. PATENT DOCUMENTS

| | | | | |
|---|---|---|---|---|
| 6,209,948 | B1 * | 4/2001 | Mori ................ | B62D 25/08 296/187.09 |
| 8,876,194 | B2 * | 11/2014 | Dix .................. | B62D 25/088 296/187.09 |
| 8,888,173 | B2 * | 11/2014 | Nydam ............. | B62D 25/025 296/187.12 |
| 9,227,665 | B2 * | 1/2016 | Mildner ............ | B62D 25/04 |
| 9,487,239 | B2 * | 11/2016 | Schnug ............. | B62D 25/04 |

FOREIGN PATENT DOCUMENTS

| | | |
|---|---|---|
| JP | 2005-193843 A | 7/2005 |
| JP | 2013-141928 A | 7/2013 |

* cited by examiner

*Primary Examiner* — Pinel E Romain
(74) *Attorney, Agent, or Firm* — Studebaker & Brackett PC

(57) ABSTRACT

A dash cross member which extends in a vehicle width direction is provided at a dash panel. A hinge-pillar reinforcing member which rigidly connects a hinge pillar to a side sill is provided at a lower end portion of the hinge pillar. A load-transmission portion (a dash reinforcement) to transmit a load which is inputted to the hinge-pillar reinforcing member in an inward direction of the vehicle width direction to the dash cross member is provided at the dash panel.

4 Claims, 7 Drawing Sheets

_US 10,676,134 B2_

VEHICLE-BODY STRUCTURE

BACKGROUND OF THE INVENTION

The present invention relates to a vehicle-body structure which comprises a hinge pillar which is provided at a side part of a vehicle at a position located in back of a front wheel and extends in a vertical direction.

There is a case where a vehicle collides with an obstacle at a position located on an outward side, in a vehicle width direction, of a front side frame of the vehicle, which is called a small overlap collision as a manner of a vehicle frontal collision. When a front wheel of the vehicle moves back and contacts the hinge pillar in the small overlap collision, the hinge pillar is possibly deformed by the front wheel moving back.

Herein, according to a structure disclosed in Japanese Patent Laid-Open publication No. 2013-141928, a guide means having a slant face is provided inside a hinge pillar (front pillar) and a front wheel is guided toward a vehicle rearward-and-outward side by this guide means in the small overlap collision, whereby the hinge pillar is suppressed from being deformed in the small overlap collision.

In the above-described structure of the patent document, however, the hinge pillar receives a load which is inputted in an inward direction of the vehicle width direction as a reaction force of the above-described guiding by the guide means. Further, since the front wheel is generally supported at one end of a suspension arm (lower arm) and the other end of the suspension arm is supported by an axis extending in the vertical direction at a suspension cross member via a rubber bush, the moving back of the front wheel causes a rotation of the suspension arm around the above-described axis and finally a rear part of the front wheel is displaced inward in the vehicle width direction. Accordingly, when the front wheel hits against the hinge pillar, the load inputted in the inward direction of the vehicle width direction tends to be applied to the hinge pillar even if the front wheel is not guided toward the vehicle rearward-and-outward side. As a result, there is a possibility that when the front wheel hits against the hinge pillar, the hinge pillar may be deformed inward in the vehicle width direction even if the hinge pillar is suppressed from being deformed rearward in the longitudinal direction. Therefore, there is room for improvement.

SUMMARY OF THE INVENTION

The present invention has been devised in view of the above-described matter, and an object of the present invention is to properly suppress the hinge pillar from being deformed inward in the vehicle width direction even if the front wheel hits against the hinge pillar and thereby the load inputted in the inward direction of the vehicle width direction is applied to the hinge pillar in the vehicle frontal collision (in the small overlap collision, in particular).

The present invention is a vehicle-body structure which comprises a dash panel, a hinge pillar provided at a side part of a vehicle at a position located in back of a front wheel and extending in a vertical direction, and connected to the dash panel, a dash cross member provided at the dash panel and extending in a vehicle width direction, a side sill extending in a vehicle longitudinal direction and connected to a lower end portion of the hinge pillar at a front end portion thereof, and a hinge-pillar reinforcing member provided at the lower end portion of the hinge pillar and rigidly connecting the hinge pillar to the side sill, wherein the dash cross member is provided to be spaced, in the vehicle width direction, apart from the hinge-pillar reinforcing member at the dash panel, and a load-transmission portion to transmit a load which is inputted to the hinge-pillar reinforcing member in an inward direction of the vehicle width direction to the dash cross member is provided at the dash panel.

According to the present invention, even if the front wheel hits against the hinge pillar and thereby the load inputted in the inward direction of the vehicle width direction is applied to the hinge pillar in the vehicle frontal collision (in the small overlap collision, in particular), the load inputted in the inward direction of the vehicle width direction is transmitted from the hinge-pillar reinforcing member to the dash cross member by way of the load-transmission portion provided at the dash panel and received by the dash cross member. Accordingly, the hinge pillar can be properly suppressed from being deformed inward in the vehicle width direction.

In an embodiment of the present invention, the load-transmission portion is constituted by a dash reinforcement which is provided to extend in the vehicle width direction between the dash cross member and the hinge-pillar reinforcing member, when viewed from a vehicle forward side.

According to this embodiment, the load inputted to the hinge-pillar reinforcing member in the inward direction of the vehicle width direction can be transmitted to the dash cross member efficiently.

In another embodiment of the present invention, a side-sill reinforcing member to suppress further moving back of the front wheel which has moved back and contacted the hinge pillar in a vehicle frontal collision is provided at a vehicle forward-side part of the side sill.

According to this embodiment, the hinge pillar can be suppressed from being deformed rearward in the longitudinal direction, and also the load inputted in the inward direction of the vehicle width direction can be easily applied to the hinge pillar by the above-described rearward-deformation suppressing and the supporting structure of the front wheel by means of the suspension arm (lower arm). Thus, even if the load inputted in the inward direction of the vehicle width direction is applied to the hinge pillar, the hinge pillar can be suppressed from being deformed inward in the vehicle width direction by the hinge-pillar reinforcing member, the load-transmission portion, and the dash cross member, as described above.

Other features, aspects, and advantages of the present invention will become apparent from the following description which refers to the accompanying drawings.

DETAILED DESCRIPTION OF THE INVENTION

Figure 1:
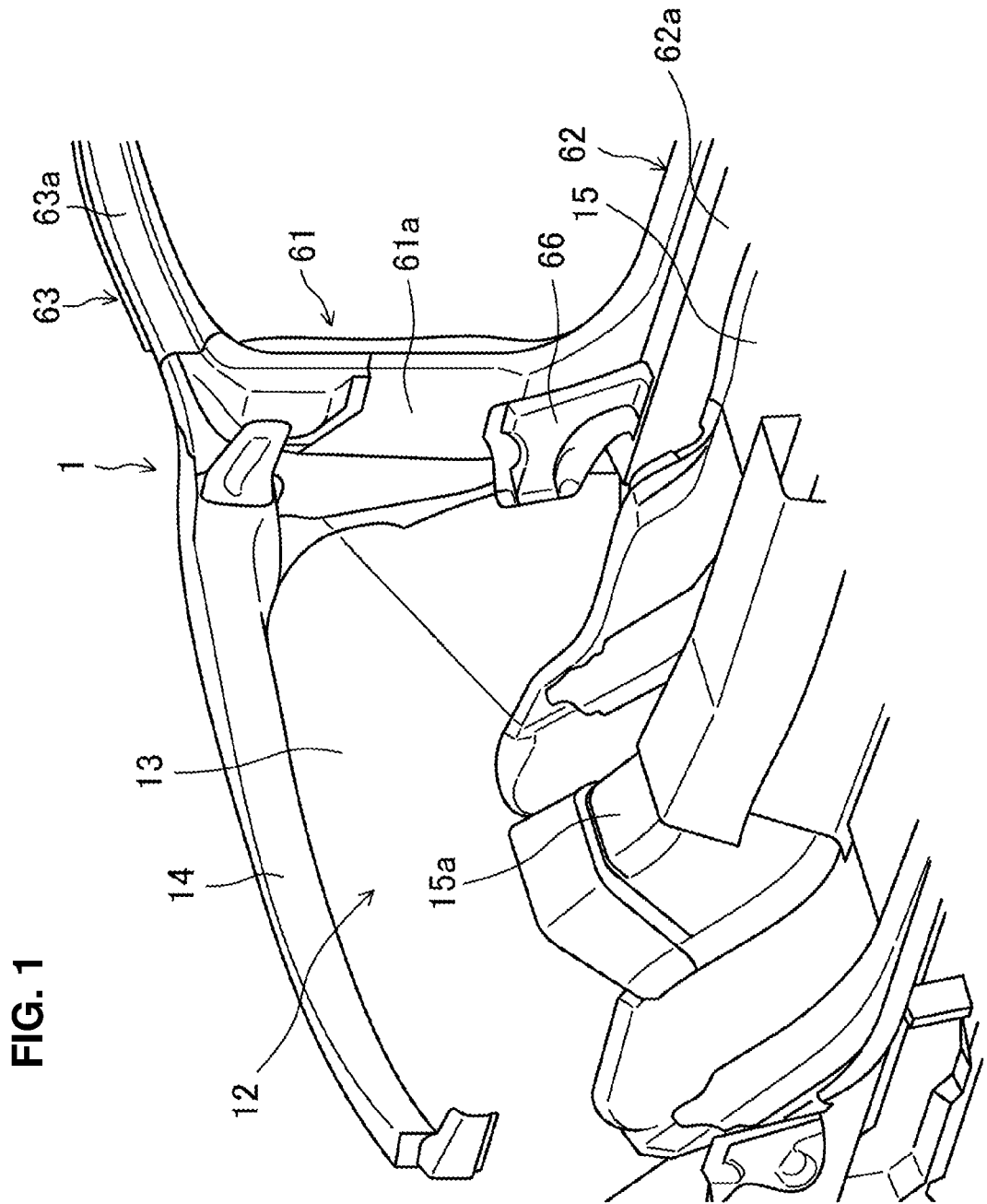
FIG. 1 is a perspective view showing a major part of a right-and-front side portion of a cabin of a vehicle to which a vehicle-body structure according to an embodiment of the present invention is applied, when viewed from a rearward-and-inward side (leftward side) of the vehicle.

Hereafter, an embodiment of the present invention will be described specifically referring to the drawings.

Figure 2:
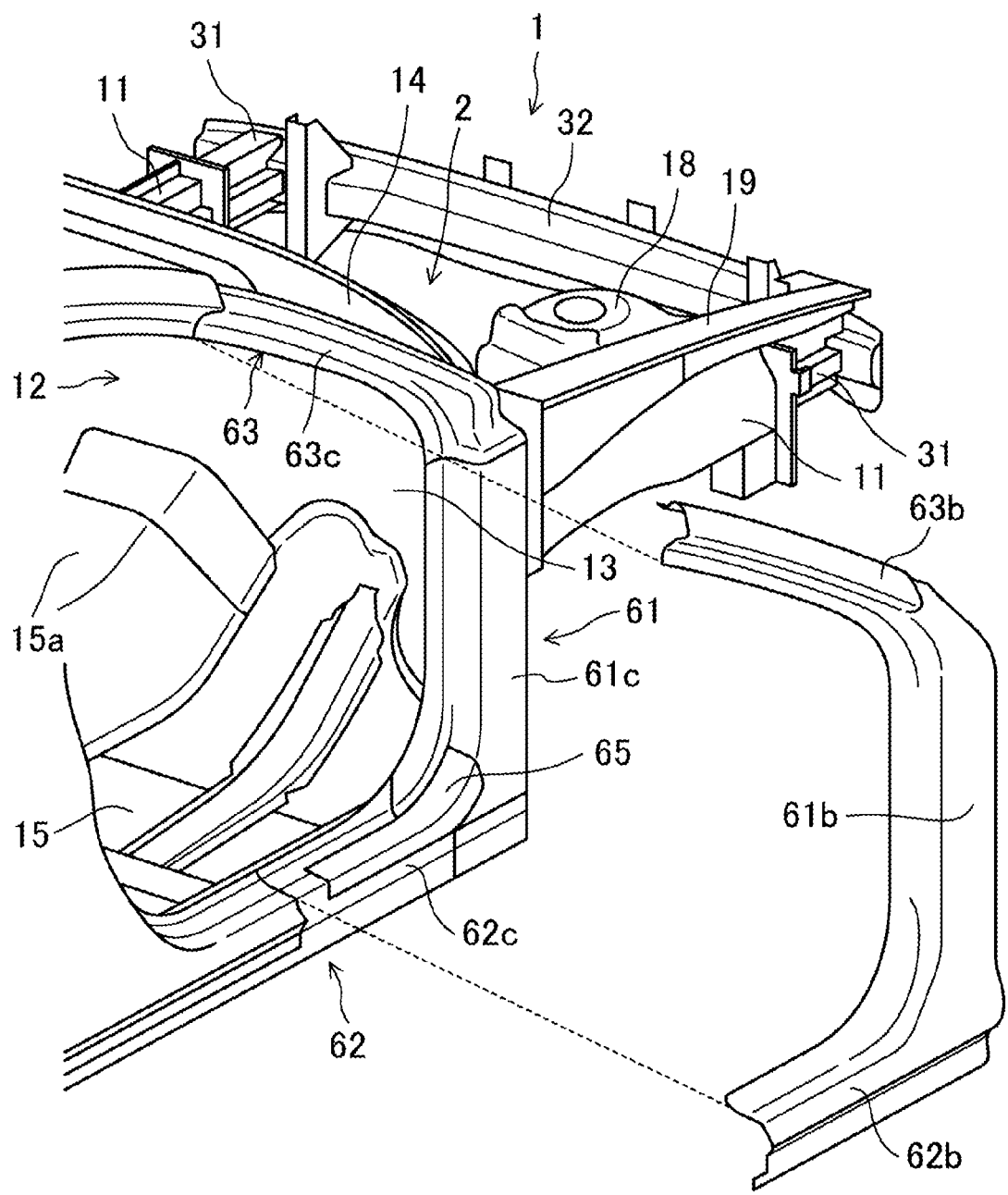
FIG. 2 is a perspective view showing a front part of the vehicle and a surrounding portion of a right-side hinge pillar, when viewed from a rearward-and-outward side (rightward side) of the vehicle.

FIGS. 1 and 2 show a major part of a vehicle 1 to which a vehicle-body structure according to an embodiment of the present invention is applied. An engine room 2 where a powertrain to drive right-and-left front wheels 3 (see FIG. 6) of the vehicle 1 is arranged is provided at a front part of the vehicle 1. The powertrain comprises an engine and a transmission where a torque (power) generated by the engine is inputted. The engine and the transmission are aligned in a vehicle width direction between a pair of right-and-left front side frames 11 which will be described. Hereafter, the directional terms of "forward," "rearward," "leftward," "rightward," "upward," and "downward" with respect to the vehicle 1 are referred to as "forward," "rearward," "leftward," "rightward," "upward," and "downward" simply.

The right-and-left front side frames 11 which have a roughly rectangular-shaped closed cross section extending in a longitudinal direction are arranged at both-side end portions, in the vehicle width direction, of the engine room 2. A dash panel 13 which partitions the engine room 2 from a cabin 12 is provided at a rear end portion of the engine room 2. A cowl member 14 is joined to an upper end portion of the dash panel 13. Respective rear end portions of right-and-left apron reinforcement members 19 (the right-side apron reinforcement member 19 is illustrated only in FIG. 2) which extend in the longitudinal direction are connected to both-side ends, in the vehicle width direction, of the cowl member 14. A floor panel 15 which constitutes a floor of the cabin 12 is joined to a lower end portion of the dash panel 13. A tunnel portion 15a is provided at a central portion, in the vehicle width direction, of the floor panel 15.

A wheel house panel (not illustrated) and a suspension tower 18 (the right-side suspension tower 18 is illustrated only in FIG. 2) are provided on the outward side, in the vehicle width direction, of each of the right-and-left front side frames 11. The wheel house panel is configured in an arc shape such that it covers over the front wheel 3, and a front wheel house is formed in this arc shape. Each of the right-and-left front side frames 11 is fixed to a lower end portion of the suspension tower 18, and an upper end portion of each of the right-and-left suspension towers 18 is fixed to the apron reinforcement member 19.

A crash can 31 is provided at a front end face of each of the right-and-left front side frames 11, and respective front end faces of the right-and-left crash cans 31 are fixed to right-and-left both end portions of a bumper beam 32 which extends in the vehicle width direction.

Figure 6:
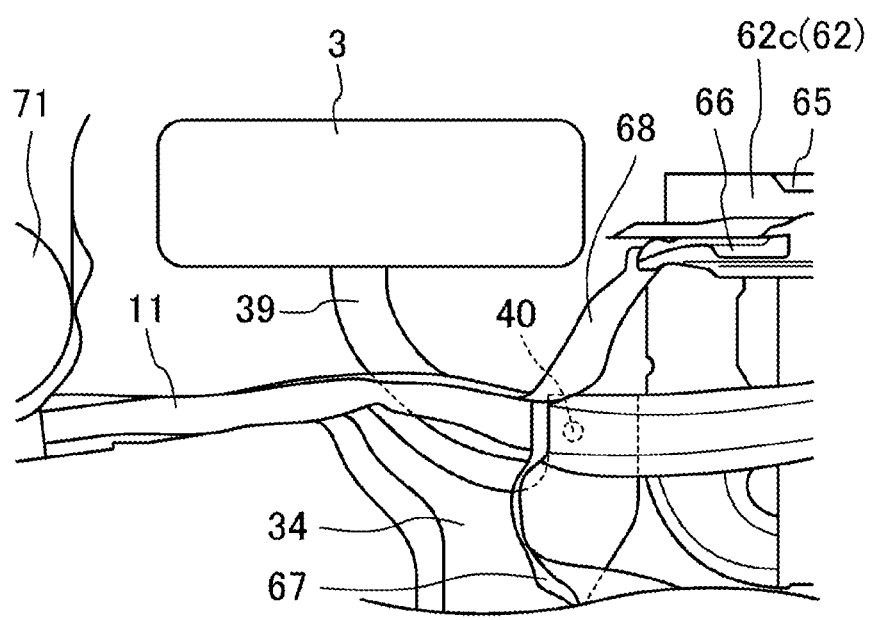
FIG. 6 is a plan view schematically showing a deformation manner of a right-side part of the vehicle when a small overlap collision of a right-side part of a front face of the vehicle with an obstacle occurs.
Figure 7:
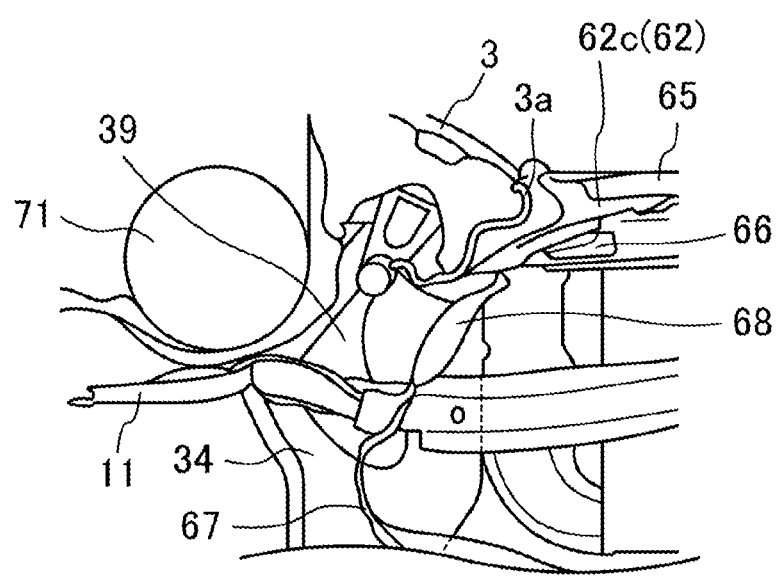
FIG. 7 is a plan view schematically showing the deformation manner of the right-side part of the vehicle, which corresponds to FIG. 6, in a state where the obstacle has moved back further relative to the vehicle.

The right-and-left front wheels 3 are supported, via right-and-left suspension arms 39 (lower arms), at a suspension cross member 34 (a part thereof is illustrated in FIGS. 6 and 7) which extends in the vehicle width direction below the right-and-left front side frames 11 and interconnects the right-and-left front side frames 11. The front wheel 3 is supported by one end portion (an outward end portion in the vehicle width direction) of the suspension arm 39, and the other end portion (an inward end portion in the vehicle width direction) of the suspension arm 39 is supported by an axis 40 (see FIG. 6) which extends in a vertical direction at an end portion of a rear-side part of the suspension cross member 34 via a rubber bush. Further, a middle part, in a longitudinal direction, of the suspension arm 39 is supported at an end portion of a forward-side part of the suspension cross member 34 by a longitudinally-extending axis via a rubber bush, which is not illustrated.

A hinge pillar 61 which extends in the vertical direction is provided at each of the right-and-left both side parts of the vehicle 1 at a position located in back of the front wheel 3. Both-side end portions, in the vehicle width direction, of the dash panel 13 are connected to respective front end portions of the right-and-left hinge pillars 61 (specifically, an inner members 61a which will be described later).

Respective front end portions of right-and-left side sills 62 which extend in the longitudinal direction are connected to respective lower end portions of the right-and-left hinge pillars 61. Respective lower end portions (front end portions) of right-and-left front pillars 63 which extend obliquely forward and downward are connected to respective upper end portions of the right-and-left hinge pillars 61.

Herein, the left-side hinge pillar 61, the left-side side sill 62, and the left-side front pillar 63 are not illustrated. Further, since the vehicle-body structure according to the present embodiment is configured to be laterally symmetrical (symmetrical to a plane passing through a center, in the vehicle width direction, of the vehicle 1), the right-side part of the vehicle 1 will be basically described referring to the drawings. Further, the followings substantially describe respective right-side members regarding both-side arranged members (including a side-sill reinforcing member 65, a hinge-pillar reinforcing member 66, and a dash reinforcement 68 which will be described later) unless there is any particular description.

The hinge pillar 61 comprises an inner member 61a, an outer member 61b which forms a closed cross section together with the inner member 61a, and a reinforcement 61c which is provided inside the closed cross section between the inner member 61a and the outer member 61b. Likewise, the side sill 62 comprises an inner member 62a, an outer member 62b which forms a closed cross section together with the inner member 62a, and a reinforcement 62c which is provided inside the closed cross section between the inner member 62a and the outer member 62b. Similarly, the front pillar 63 comprises an inner member 63a, an outer member 63b which forms a closed cross section together with the inner member 63a, and a reinforcement 63c which is provided inside the closed cross section between the inner member 63a and the outer member 63b. The outer member 61b of the hinge pillar 61 is integrally formed with the outer member 62b of the side sill 62 and the outer member 63b of the front pillar 63 (see FIG. 2).

The side-sill reinforcing member 65 which extends in the longitudinal direction is provided at a forward-side part of the reinforcement 62c of the side sill 62 as shown in FIG. 2. The side-sill reinforcing member 65 is configured to suppress further moving back of the front wheel 3 which has moved back and contacted the hinge pillar 61 (i.e., to suppress reward deformation of the hinge pillar 61) in the frontal collision of the vehicle 1 (the small overlap collision, in particular).

Figure 3:
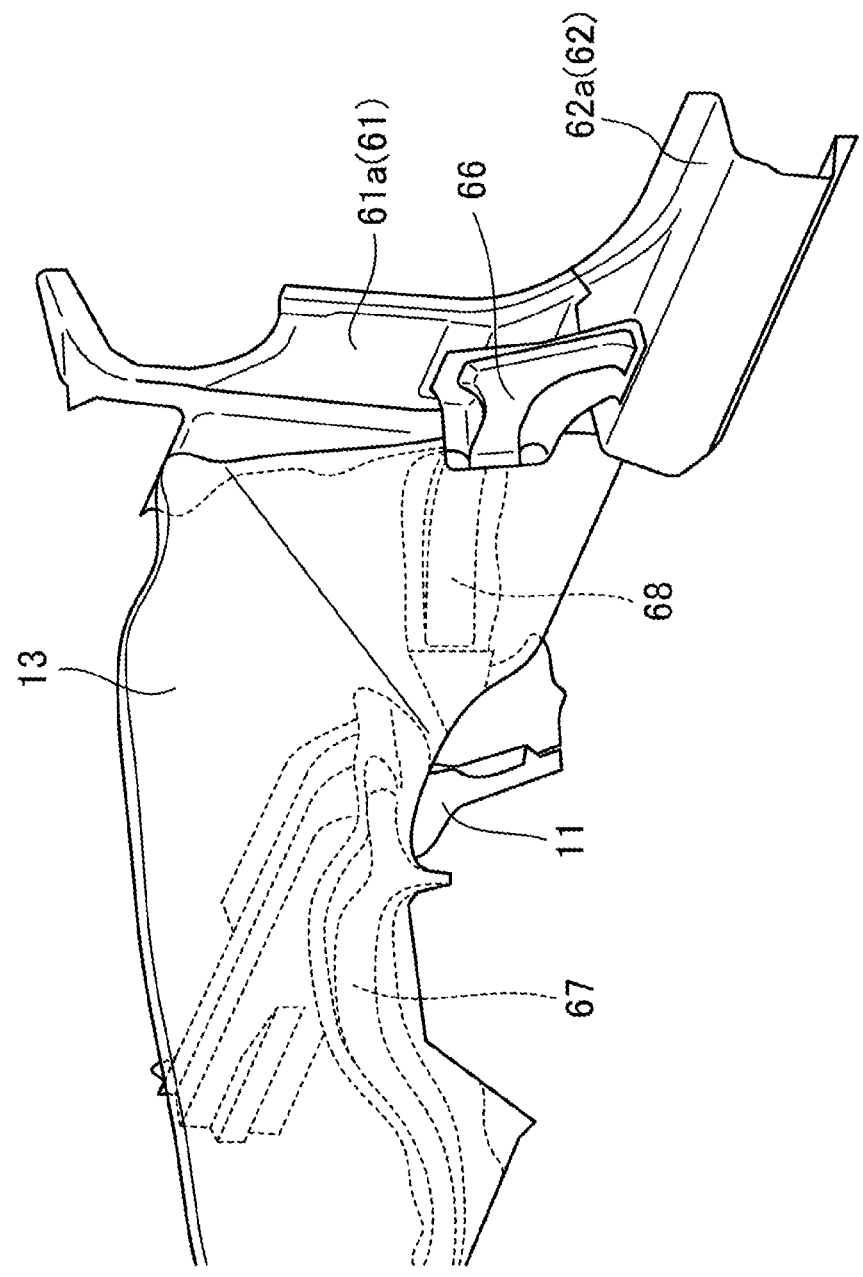
FIG. 3 is a perspective view showing the right-side hinge pillar, a front end portion of a right-side side sill, and a right-side end portion of a dash panel, when viewed from the rearward-and-inward side of the vehicle.

As shown in FIGS. 1 and 3, the hinge-pillar reinforcing member 66 which rigidly connects the hinge pillar 61 to the side sill 62 is provided at a lower end portion of the hinge pillar 61 (specifically, at an inward face, in the vehicle width direction, of the inner member 61a of the hinge pillar 61). The hinge-pillar reinforcing member 66 is configured to prevent the hinge pillar 61 from falling down in the longitudinal direction and in the vehicle width direction relative to the side sill 62, in particular, in the inward direction of the vehicle width direction.

Figure 4:
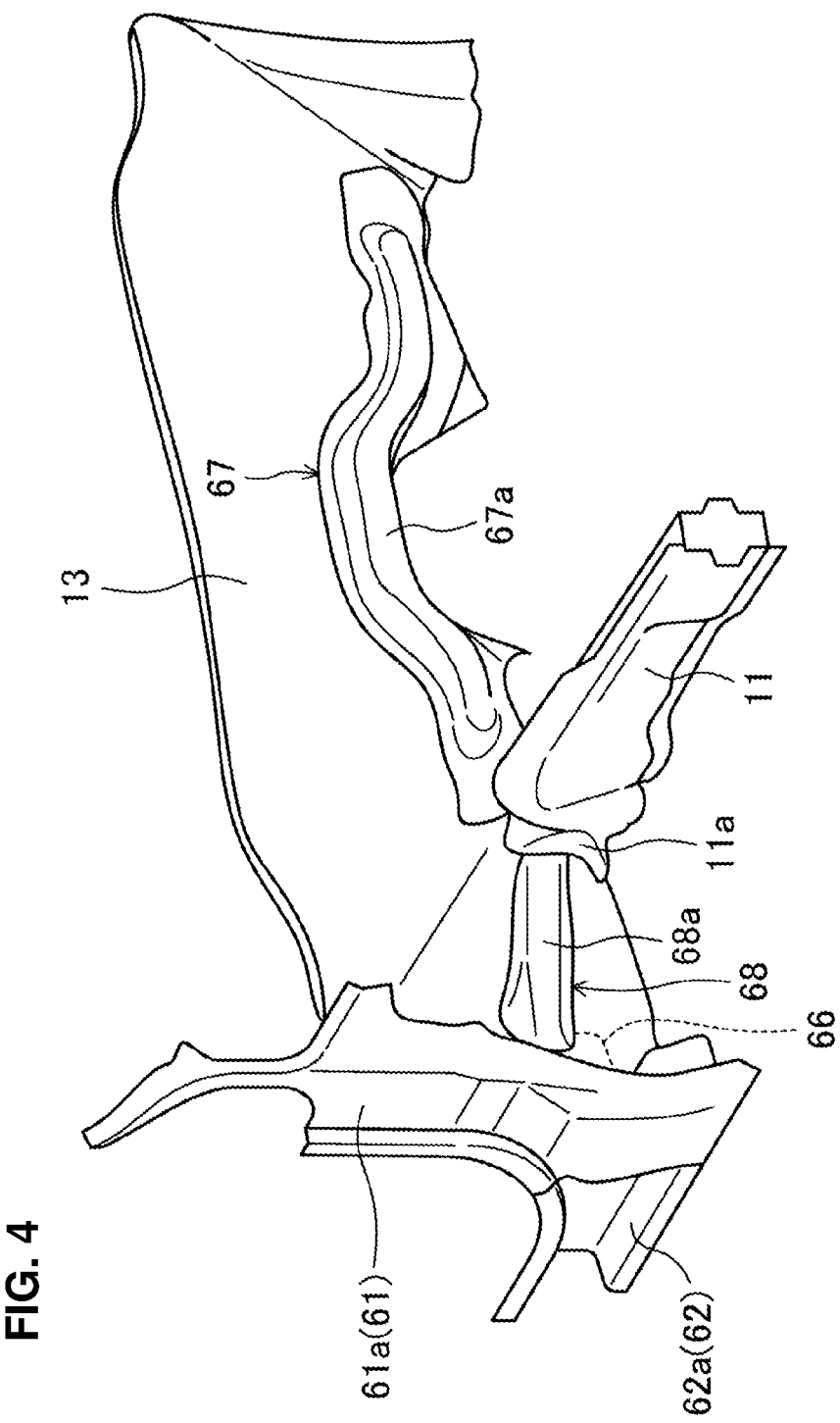
FIG. 4 is a perspective view showing positional relationships of a dash cross member and a right-side dash reinforcement which are provided at a dash panel and a right-side front side frame, when viewed from a forward-and-rightward side of the vehicle.
Figure 5:
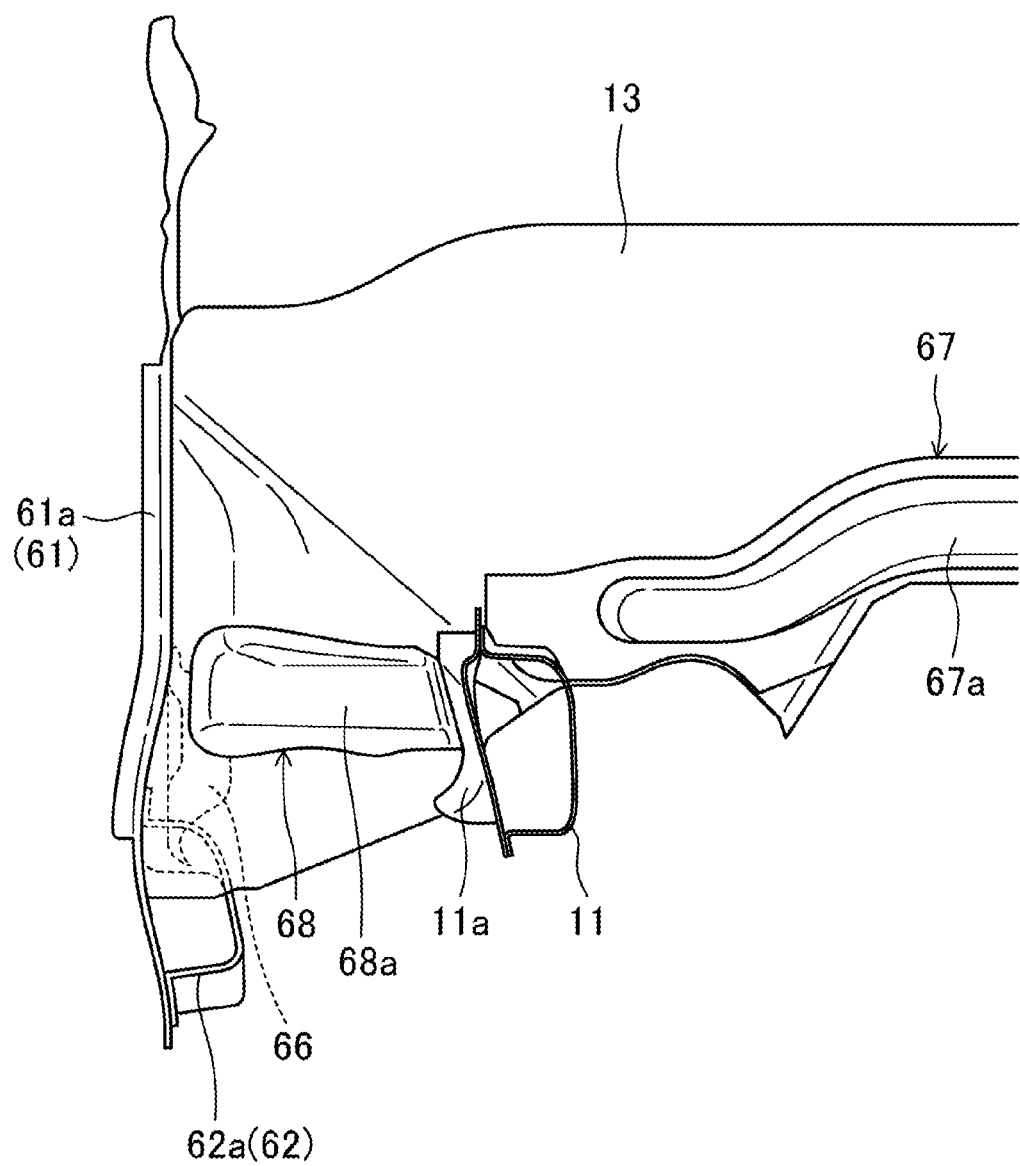
FIG. 5 is an elevational view of a right-side portion of the dash panel, when viewed from a forward side of the vehicle (a sectional view of the right-side front side frame).

As shown in FIGS. 4 and 5, a dash cross member 67 which extends in the vehicle width direction is provided at a lower end portion of a forward-side face of the dash panel 13 (a face positioned on the side of the engine room 2). Herein, a central portion, in the vehicle width direction, of the dash cross member 67 is curved such that it protrudes upward so as to correspond to the tunnel portion 15a.

The dash cross member 67 is joined to the forward-side face of the dash panel 13 by welding. A protrusion portion 67a which protrudes forward and extends in the vehicle width direction is formed at a central portion, in the vertical direction, of a part of the dash cross member 67, excluding both end portions, in the vehicle width direction, of the dash cross member 67, and the part of the dash cross member 67, excluding the both end portions, in the vehicle width direction, thereof is configured to have a hat-shaped cross section. Respective lower-side portions of both end portions, in the vehicle width direction, of the dash cross member 67 and respective upper-side portions of the right-and-left front side frame 11 overlap each other in the longitudinal direction, and the dash cross member 67 is also joined to the right-and-left front side frames 11. In FIG. 4, illustration of the left-side front side frame 11 is omitted and also illustration of the left-side one of the dash reinforcements 68 which will be described later is omitted.

The dash cross member 67 is positioned at the forward-side face of the dash panel 13 between the right-and-left front side frames 11. Accordingly, the dash cross member 67 is provided to be spaced, in the vehicle width direction, apart from the hinge-pillar reinforcing member 66. Herein, the front side frame 11 is configured to extend obliquely rearward and downward from the same longitudinal position as the dash panel 13.

Further, the dash reinforcement 68 extending in the vehicle width direction is provided at an outward-side portion in the vehicle width direction, of the dash cross member 67 provided at the forward-side face of the dash panel 13. The dash reinforcement 68 is joined to the forward-side face of the dash panel 13 by welding similarly to the dash cross member 67. A protrusion portion 68a which protrudes forward and extends in the vehicle width direction is formed at a central portion, in the vertical direction, of a part of the dash reinforcement 68, excluding both end portions, in the vehicle width direction, of the dash reinforcement 68, and the part of the dash reinforcement 68, excluding the both end portions, in the vehicle width direction, thereof is configured to have a hat-shaped cross section.

A flange portion 11a which protrudes outward at a position located right in front of the dash panel 13 is formed at the forward-side face, in the vehicle width direction, of the front side frame 11. An inward-side end portion, in the vehicle width direction, of the dash reinforcement 68 is joined to the flange portion 11a and the dash panel 13 in a state where the dash reinforcement 68 is interposed between the flange portion 11a and the dash panel 13. Herein, an inward-side end portion, in the vehicle width direction, of the dash reinforcement 68 is positioned such that this inward-side end portion overlaps an end portion, in a longitudinal direction, of the dash cross member 67 (a right-side end portion in the present embodiment) in the vehicle width direction.

A forward-side end portion of the hinge-pillar reinforcing member 66 is joined to the dash panel 13 such that the dash panel 13 is interposed between this forward-side end portion and an outward-side end portion, in the vehicle width direction, of the dash reinforcement 68.

Thus, the dash reinforcement 68 is provided to extend in the vehicle width direction between the dash cross member 67 and the hinge-pillar reinforcing member 66, when viewed from a vehicle forward side. Thereby, the dash reinforcement 68 serves as a load-transmission portion to transmit a load which is inputted to the hinge-pillar reinforcing member 66 in the inward direction of the vehicle width direction to the dash cross member 67.

Herein, it is supposed, as shown in FIG. 6, that a so-called small overlap collision in which a part of a front face of the vehicle 1 which is positioned on the outward side, in the vehicle width direction, of the front side frame 11 (on the left-side part in the present embodiment) collides with an obstacle 71 (see FIGS. 6 and 7).

In the small overlap collision, the front wheel 3 is made to move back by the obstacle 71. Herein, the middle part, in the longitudinal direction, of the suspension arm 39 is detached from the suspension cross member 34 and comes not to be supported by the suspension cross member 34. Accordingly, as the front wheel 3 moves back, the suspension arm 39 rotates around the axis 40, so that a rear part of the front wheel 3 is displaced inward in the vehicle width direction.

Then, when a wheel 3a of the front wheel 3 hits against a front face of the hinge pillar 61 as shown in FIG. 7, the load inputted in the inward direction of the vehicle width direction is applied to the hinge pillar 61, in addition to a load inputted in the rearward direction. Since the load inputted in the rearward direction is received by the side-sill reinforcing member 65, the hinge pillar 61 is suppressed from being deformed rearward in the longitudinal direction. This suppression and the rotation of the suspension arm 39 around the axis 40 jointly cause the rear part of the front wheel 3 to be displaced inward in the vehicle width direction. Consequently, the load inputted in the rearward direction is applied more greatly to the hinge pillar 61.

The load inputted in the rearward direction which is applied to the hinge pillar 61 as described above is inputted to the hinge-pillar reinforcing member 66. This load inputted to the hinge-pillar reinforcing member 66 is transmitted from the hinge-pillar reinforcing member 66 to the dash cross member 67 by way of the dash reinforcement 68 of the dash panel 13 and received by the dash cross member 67. Consequently, the hinge pillar 61 is suppressed from being deformed inward in the vehicle width direction as well.

The present invention should not be limited to the above-described embodiment and any other modifications or improvements may be applied within the scope of a spirit of the present invention.

For example, while the load transmission portion to transmit the load inputted in the inward direction of the vehicle width direction applied to the hinge-pillar reinforcing member 66 to the dash cross member 67 is constituted by the dash reinforcement 68 in the above-described embodiment, a bead which extends in the vehicle width direction is provided at a part of the dash panel 13 which is located between the hinge-pillar reinforcing member 66 and the dash cross member 67 (a part where the dash reinforcement 68 is provided in the present embodiment) may constitute the load transmission portion.

What is claimed is:

1. A vehicle-body structure, comprising:
   a dash panel;
   a hinge pillar provided at a side part of a vehicle at a position located in back of a front wheel and extending in a vertical direction, and connected to the dash panel;
   a dash cross member provided at the dash panel and extending in a vehicle width direction;
   a side sill extending in a vehicle longitudinal direction and connected to a lower end portion of the hinge pillar at a front end portion thereof; and
   a hinge-pillar reinforcing member provided at the lower end portion of the hinge pillar and connecting the hinge pillar to the side sill such that the hinge pillar is rigidly connected to, and directly contacting, the side sill,
   wherein said dash cross member is provided to be spaced, in the vehicle width direction, apart from said hinge-pillar reinforcing member at the dash panel, and a load-transmission portion to transmit a load which is inputted to said hinge-pillar reinforcing member in an inward direction of the vehicle width direction to said dash cross member is provided at said dash panel.

2. The vehicle-body structure of claim 1, wherein said load-transmission portion is constituted by a dash reinforcement which is provided to extend in the vehicle width direction between said dash cross member and the hinge-pillar reinforcing member, when viewed from a vehicle forward side.

3. The vehicle-body structure of claim 2, wherein a side-sill reinforcing member to suppress further moving back of the front wheel which has moved back and contacted said hinge pillar in a vehicle frontal collision is provided at a vehicle forward-side part of said side sill.

4. The vehicle-body structure of claim 1, wherein a side-sill reinforcing member to suppress further moving back of the front wheel which has moved back and contacted said hinge pillar in a vehicle frontal collision is provided at a vehicle forward-side part of said side sill.

\* \* \* \* \*